United States Patent
Yan et al.

(10) Patent No.: US 11,026,267 B2
(45) Date of Patent: Jun. 1, 2021

(54) RANDOM ACCESS PREAMBLE SENDING METHOD AND APPARATUS

(71) Applicant: Huawei Technologies Co., Ltd., Shenzhen (CN)

(72) Inventors: Mao Yan, Chengdu (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/530,649

(22) Filed: Aug. 2, 2019

(65) Prior Publication Data
US 2019/0357271 A1 Nov. 21, 2019

Related U.S. Application Data

(63) Continuation of application No. PCT/CN2018/074983, filed on Feb. 1, 2018.

(30) Foreign Application Priority Data

Feb. 3, 2017 (CN) .......................... 201710063468.9

(51) Int. Cl.
  *H04W 74/08* (2009.01)
  *H04L 12/24* (2006.01)
  *H04W 72/10* (2009.01)

(52) U.S. Cl.
  CPC ..... *H04W 74/0833* (2013.01); *H04L 41/0654* (2013.01); *H04W 72/10* (2013.01)

(58) Field of Classification Search
  CPC ............. H04W 72/10; H04W 72/1257; H04W 72/0446; H04W 72/0453; H04W 74/0833;
  (Continued)

(56) References Cited

U.S. PATENT DOCUMENTS

2009/0316586 A1  12/2009 Yi et al.
2014/0016573 A1*  1/2014 Nuggehalli .......... H04B 7/0617
                                                    370/329

(Continued)

FOREIGN PATENT DOCUMENTS

| CN | 101478778 A | 7/2009 |
| CN | 101662836 A | 3/2010 |
| WO | 2016086144 A1 | 6/2016 |

OTHER PUBLICATIONS

"RACH Preamble and Procedures for Unified Single and Multiple Beam Based Access," 3GPP TSG RAN WG1 Meeting #86bis, Lisbon, Portugal, R1-1608824, pp. 1-4, 3rd Generation Partnership Project, Valbonne, France (Oct. 10-14, 2016).

(Continued)

*Primary Examiner* — Ian N Moore
*Assistant Examiner* — Sun Jong Kim
(74) *Attorney, Agent, or Firm* — Leydig, Voit & Mayer, Ltd.

(57) ABSTRACT

A random access preamble sending method and an apparatus is provided. The method includes sending, by user equipment, a first random access preamble to a network device, where the first random access preamble is used by the user equipment to access the network device; and when the user equipment fails in accessing the network device by using the first random access preamble, sending at least one second random access preamble to the network device, where access characteristic information of each second random access preamble is different from that of the first random access preamble, the access characteristic information includes at least one of a time length, a transmit beam, and a random access resource, and the at least one second random access preamble is used by the user equipment to access the network device.

18 Claims, 8 Drawing Sheets

(58) Field of Classification Search
CPC . H04W 72/14; H04W 72/046; H04W 72/085; H04W 74/04; H04W 74/00; H04W 74/06; H04W 74/08
See application file for complete search history.

(56) References Cited

U.S. PATENT DOCUMENTS

| | | |
|---|---|---|
| 2015/0016312 A1 | 1/2015 | Li et al. |
| 2016/0295609 A1 | 10/2016 | Vajapeyam et al. |
| 2016/0302080 A1* | 10/2016 | Hwang ............. H04W 72/0473 |
| 2020/0053800 A1* | 2/2020 | Deng ................. H04L 27/2607 |

OTHER PUBLICATIONS

"Unified single/multiple beam-based initial access procedure in NR," 3GPP TSG RAN WG1 Meeting #86bis, Lisbon, Portugal, R1-1608823, pp. 1-6, 3rd Generation Partnership Project, Valbonne, France (Oct. 10-14, 2016).

"On RACH retransmission," 3GPP TSG-RAN WG1 NR adhoc, Spokane, Washington, R1-1700304, pp. 1-4, 3rd Generation Partnership Project, Valbonne, France (Jan. 16-20, 2017).

* cited by examiner

RANDOM ACCESS PREAMBLE SENDING METHOD AND APPARATUS

CROSS-REFERENCE TO RELATED APPLICATIONS

This application is a continuation of International Application No. PCT/CN2018/074983, filed on Feb. 1, 2018, which claims priority to Chinese Patent Application No. 201710063468.9, filed on Feb. 3, 2017. The disclosures of the aforementioned applications are hereby incorporated by reference in their entireties.

TECHNICAL FIELD

Embodiments of the present invention relates to the field of communications technologies, and in particular, to a random access preamble sending method and an apparatus.

BACKGROUND

In a long term evolution (LTE) system, a contention-based random access procedure may be shown in a schematic flowchart of FIG. 1. The procedure includes: User equipment (UE) sends a random access preamble (a message 1) to a base station; when the random access preamble sent by the UE is detected, the base station sends a random access response (a message 2) to the UE, where the message 2 includes an index number of the detected random access preamble, adjustment information used for uplink time synchronization, and an uplink resource allocated for the UE to send a message 3; when receiving the message 2, the UE decodes the message 2, obtains an uplink synchronization time and the uplink resource, and sends the message 3 to the base station, where the message 3 carries a UE identifier; when the message 3 is detected, the base station sends a contention resolution message (a message 4) to the UE, where the message 4 carries a UE identifier; and when receiving the message 4, the UE determines, based on whether the UE identifier carried in the message 4 is the same as the UE identifier carried in the message 3, whether the UE has successfully accessed the base station, and if the two UE identifiers are the same, determines that the UE has successfully accessed the base station, or if the two UE identifiers are different, determines that the UE fails in accessing the base station.

Based on the schematic flowchart of FIG. 1, access by the UE may fail in a random access procedure. Main causes for an LTE random access failure include: (1) The random access preamble sent by the UE to the base station does not arrive at the base station, and consequently the base station detects no random access preamble. (2) The base station detects the random access preamble and sends the random access response to the UE, but the UE detects no random access response. (3) The UE detects the random access response and sends the message 3 to the base station, but the base station detects no message 3, an error occurs in detecting the message 3, or a quantity of continuous errors in the message 3 exceeds a maximum quantity of retransmission failures. (4) The base station detects the message 3 and sends the message 4 to the UE, but the UE detects no message 4, or the UE detects the message 4 but the UE identifier carried in the message 4 is different from the UE identifier carried in the message 3 sent by the UE.

In a future wireless communications network, an access failure may also occur during a random access procedure of UE. A solution to a random access failure in the LTE system may be inapplicable to the future wireless communications network, and currently, no solution is proposed for a random access failure in the future wireless communications network.

SUMMARY

Embodiments of the present invention provide a random access preamble sending method and an apparatus, to resolve a problem of a random access failure in a future wireless communications network caused by the fact that a random access preamble does not arrive at a network device, thereby increasing a probability that the random access preamble arrives at the network device and increasing a random access success rate.

According to a first aspect, an embodiment of the present invention provides a random access preamble sending method, including:

sending, by user equipment, a first random access preamble to a network device, where the first random access preamble is used by the user equipment to access the network device; and when the user equipment fails in accessing the network device by using the first random access preamble, sending, by the user equipment, at least one second random access preamble to the network device, where access characteristic information of each of the at least one second random access preamble is different from that of the first random access preamble, the access characteristic information includes at least one of a time length, a transmit beam, and a random access resource, and the at least one second random access preamble is used by the user equipment to access the network device.

In the first aspect, when the user equipment fails in accessing the network device by using the first random access preamble, the user equipment selects the at least one second random access preamble whose access characteristic information is different from that of the first random access preamble, to perform access, so as to resolve a problem of a random access failure in a future wireless communications network caused by the fact that a random access preamble does not arrive at the network device, thereby increasing a probability that the random access preamble arrives at the network device and increasing a random access success rate.

In a possible implementation, access characteristic information of any two of the at least one second random access preamble is different, so that the random access success rate is increased.

In a possible implementation, if a time length of each second random access preamble is different from that of the first random access preamble, the time length of each second random access preamble is greater than that of the first random access preamble, so that energy of each second random access preamble is higher than that of the first random access preamble, thereby increasing a probability that each second random access preamble arrives at the network device.

In a possible implementation, if a transmit beam of each second random access preamble is different from that of the first random access preamble, a random access resource of each second random access preamble is the same as or different from that of the first random access preamble. To be specific, when the transmit beams are different, a random access resource that is the same as or different from the random access resource of the first random access preamble may be used for sending the second random access preamble, so as to attempt to obtain a transmit beam and a random access resource that match each other best, thereby increasing the random access success rate.

In a possible implementation, if a random access resource of each second random access preamble is different from that of the first random access preamble, a transmit beam of each second random access preamble is the same as or different from that of the first random access preamble. To be specific, when the random access resources are different, a transmit beam that is the same as or different from the transmit beam of the first random access preamble may be selected for sending the second random access preamble, so as to attempt to obtain a transmit beam and a random access resource that match each other best, thereby increasing the random access success rate.

In a possible implementation, the random access resource is corresponding to a receive beam of the network device, a time-domain location, or a frequency-domain location.

In a possible implementation, a transmit power of each second random access preamble is the same as or different from that of the first random access preamble, and transmit powers of any two of the at least one second random access preamble are the same or different. The transmit power of each second random access preamble may be higher than that of the first random access preamble, so that the random access success rate is increased. Alternatively, the transmit power of each second random access preamble may be lower than that of the first random access preamble.

In a possible implementation, the user equipment sends the at least one second random access preamble to the network device based on priorities of the time length, the transmit power, the transmit beam, and the random access resource, so that the random access success rate is increased. For example, a sequence of the priorities of these four elements in descending order is the transmit beam, the random access resource, the transmit power, and the time length. When access performed by using the first random access preamble fails, a second random access preamble A whose transmit beam is different from that of the first random access preamble (the other three elements of the second random access preamble A may be the same as those of the first random access preamble) is selected for sending; when access performed by using the second random access preamble A fails, a second random access preamble B whose random access resource is different from that of the first random access preamble or different from that of the second random access preamble A is selected for sending; and the process proceeds until access succeeds or until a maximum quantity of sending times is reached.

In a possible implementation, when access by the user equipment by using a second random access preamble with one element changed fails, the user equipment may select a random access preamble with at least two elements changed for sending, so that the random access success rate is increased.

In a possible implementation, a quantity of the at least one second random access preamble is indicated by downlink random access channel information sent by the network device, to avoid contention caused by an excessively large quantity of the at least one second random access preamble.

According to a second aspect, an embodiment of the present invention provides a random access preamble receiving method, including:

receiving, by a network device, a first random access preamble sent by user equipment, where the first random access preamble is used to request to access the network device; and when access to the network device as requested by using the first random access preamble fails, receiving, by the network device, at least one second random access preamble sent by the user equipment, where access characteristic information of each of the at least one second random access preamble is different from that of the first random access preamble, the access characteristic information includes at least one of a time length, a transmit beam, and a random access resource, and the at least one second random access preamble is used to request to access the network device.

In the second aspect, when access to the network device as requested by using the first random access preamble fails, the network device receives the at least one second random access preamble whose access characteristic information is different from that of the first random access preamble, to increase a success rate of random access of the user equipment.

In a possible implementation, access characteristic information of any two of the at least one second random access preamble is different, so that the random access success rate is increased.

In a possible implementation, if a time length of each second random access preamble is different from that of the first random access preamble, the time length of each second random access preamble is greater than that of the first random access preamble, so that energy of each second random access preamble is higher than that of the first random access preamble, and the network device can receive the second random access preamble.

In a possible implementation, if a transmit beam of each second random access preamble is different from that of the first random access preamble, a random access resource of each second random access preamble is the same as or different from that of the first random access preamble. To be specific, when the transmit beams are different, a random access resource that is the same as or different from the random access resource of the first random access preamble may be used for receiving the second random access preamble, thereby increasing the random access success rate.

In a possible implementation, if a random access resource of each second random access preamble is different from that of the first random access preamble, a transmit beam of each second random access preamble is the same as or different from that of the first random access preamble. To be specific, when the random access resources are different, a transmit beam that is the same as or different from the transmit beam of the first random access preamble may be used for receiving the second random access preamble, thereby increasing the random access success rate.

In a possible implementation, the random access resource is corresponding to a receive beam of the network device, a time-domain location, or a frequency-domain location.

In a possible implementation, a transmit power of each second random access preamble is the same as or different from that of the first random access preamble, and transmit powers of any two of the at least one second random access preamble are the same or different. The transmit power of each second random access preamble may be higher than that of the first random access preamble, so that the network device can receive the second random access preamble, thereby increasing the random access success rate. Alternatively, the transmit power of each second random access preamble may be lower than that of the first random access preamble.

In a possible implementation, the network device sends downlink random access channel information to the user equipment, to indicate a quantity of the at least one second random access preamble, so as to avoid contention caused by an excessively large quantity of the at least one second random access preamble.

According to a third aspect, an embodiment of the present invention provides user equipment, including a processor and a transceiver, where the transceiver is configured to send a first random access preamble to a network device, where the first random access preamble is used by the user equipment to access the network device; and the transceiver is further configured to: when the user equipment fails in accessing the network device by using the first random access preamble, send at least one second random access preamble to the network device, where access characteristic information of each of the at least one second random access preamble is different from that of the first random access preamble, the access characteristic information includes at least one of a time length, a transmit beam, and a random access resource, and the at least one second random access preamble is used by the user equipment to access the network device.

The user equipment provided in the third aspect is configured to perform the random access preamble sending method provided in the first aspect.

According to a fourth aspect, an embodiment of the present invention provides a network device, including a processor and a transceiver, where the transceiver unit is configured to receive a first random access preamble sent by user equipment, where the first random access preamble is used to request to access the network device; and the receiving unit is further configured to: when access to the network device as requested by using the first random access preamble fails, receive at least one second random access preamble sent by the user equipment, where access characteristic information of each of the at least one second random access preamble is different from that of the first random access preamble, the access characteristic information includes at least one of a time length, a transmit beam, and a random access resource, and the at least one second random access preamble is used to request to access the network device.

The network device provided in the fourth aspect is configured to perform the random access preamble receiving method provided in the second aspect.

According to a fifth aspect, an embodiment of the present invention provides a computer storage medium, configured to store a computer software instruction used by the foregoing user equipment. The computer software instruction includes a program designed for executing the foregoing aspects.

According to a sixth aspect, an embodiment of the present invention provides a computer storage medium, configured to store a computer software instruction used by the foregoing network device. The computer software instruction includes a program designed for executing the foregoing aspects.

In the embodiments of the present invention, when the user equipment fails in accessing the network device by using the sent first random access preamble, the user equipment sends, to the network device, the at least one second random access preamble whose access characteristic information is different from that of the first random access preamble, to resolve the problem of a random access failure in a future wireless communications network caused by the fact that a random access preamble does not arrive at the network device, thereby increasing the probability that the random access preamble arrives at the network device and increasing the random access success rate.

DESCRIPTION OF DRAWINGS

To describe the technical solutions in the embodiments of the present invention or in the background more clearly, the following describes the accompanying drawings required for describing the embodiments of the present invention or the background.

DESCRIPTION OF EMBODIMENTS

It should be understood that, the technical solutions in the embodiments of the present invention may be applied to various communications systems, such as a global system for mobile communications (GSM) system, a code division multiple access (CDMA) system, a wideband code division multiple access (WCDMA) system, a long term evolution (LTE) system, an LTE frequency division duplex (FDD) system, an LTE time division duplex (TDD) system, a universal mobile telecommunications system (UMTS), and a future wireless communications system. The future wireless communications system may include a fifth generation mobile communications (5th-Generation, 5G) system.

The present invention describes the embodiments with reference to user equipment. The user equipment may also be referred to as an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless telephone set, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, user equipment in a future wireless communications network, or the like.

The present invention describes the embodiments with reference to a network device. The network device may be a device configured to communicate with user equipment. For example, the network device may be a base transceiver station (Base Transceiver Station, BTS) in a GSM system or a CDMA system, may be a NodeB (NB) in a WCDMA system, or may be an evolved NodeB (eNB or eNodeB) in an LTE system. Alternatively, the network device may be a relay node, an access point, a vehicle-mounted device, a wearable device, a network device in a future wireless communications network, or the like.

Figure 1:
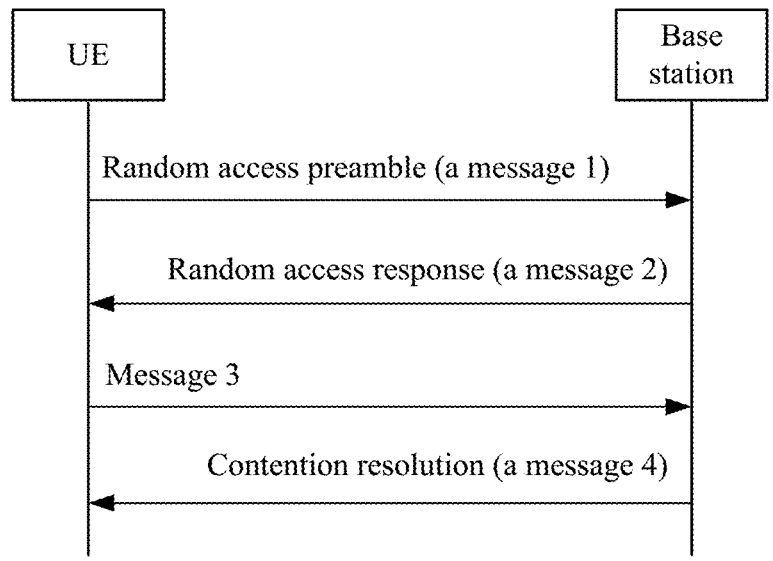
FIG. 1 is a schematic flowchart of a contention-based random access procedure in an LTE system.
Figure 2:
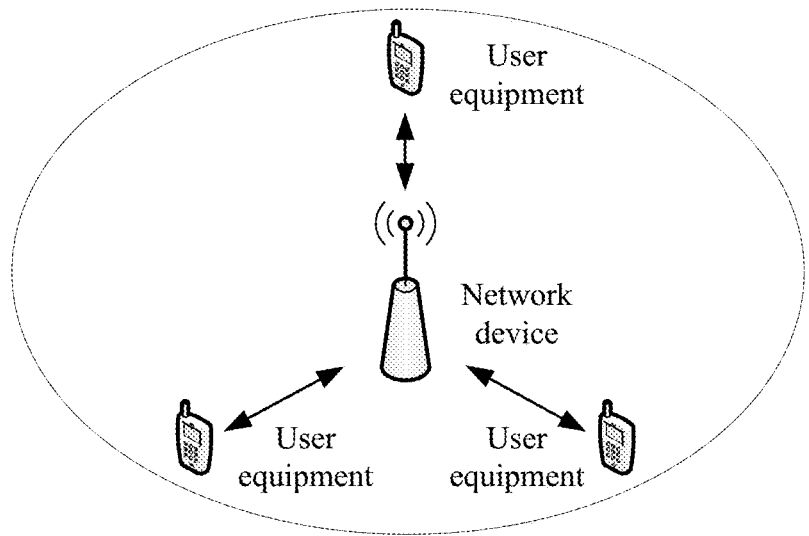
FIG. 2 is a schematic diagram of a network architecture to which an embodiment of the present invention is applied.

FIG. 2 is a schematic diagram of a network architecture to which an embodiment of the present invention is applied. Specifically, FIG. 2 is a schematic diagram of a network architecture of a cell, and the network architecture includes a network device and user equipment. It should be noted that quantities and forms of the network device and the user equipment shown in FIG. 2 do not constitute any limitation on this embodiment of the present invention.

In FIG. 2, the network device broadcasts downlink random access channel (RACH) information to the user equipment in the cell, where the downlink RACH information may be sent by using system information (SI), or the downlink RACH information may be sent by using other information in a future wireless communications network. When receiving the downlink RACH information, the user equipment selects a random access preamble based on the downlink RACH information, and sends the random access preamble to the network device. When the random access preamble is detected, the network device may send a random access response to the user equipment.

Based on the downlink RACH information and sending information of the user equipment (for example, a quantity of retransmission times and a downlink path loss estimation value), the user equipment in this embodiment of the present invention may select a random access preamble and a transmit beam, and determine a transmit power of the random access preamble and the like. Optionally, the user equipment may further select a receive beam of the network device based on the downlink RACH information and the sending information of the user equipment.

The network device in this embodiment of the present invention may receive, from the user equipment, random access preambles of different time lengths, random access preambles of different preamble formats, random access preambles of different transmit powers, random access preambles sent by using different transmit beams, and random access preambles sent by using different random access resources.

A random access time in the embodiments of the present invention is a time during which the user equipment has an opportunity to initiate random access. It is considered by default that the user equipment has obtained the downlink RACH information when initiating random access. It should be noted that the random access time is used to represent a time during which the user equipment has an opportunity to initiate random access, but the name does not constitute any limitation on the embodiments of the present invention. The time during which the user equipment has an opportunity to initiate random access may be represented by another name.

A random access resource in the embodiments of the present invention is a specific resource that is used by the user equipment to send a random access preamble to the network device, and there is a definite correspondence between a random access resource and a transmit beam of a synchronization signal. The user equipment may determine, through synchronization signal detection, a random access resource to be used by the user equipment. The random access resource may be understood as a receive beam of the network device, a time-domain location, or a frequency-domain location.

Figure 3A:
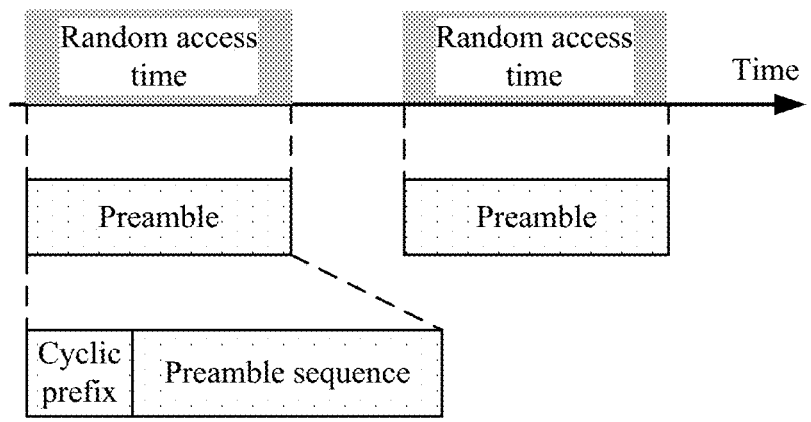
FIG. 3a is a schematic diagram of a random access time in an LTE system.

FIG. 3a is a schematic diagram of a random access time in an LTE system. As shown in FIG. 3a, there are a plurality of random access times in a timeline, and any two adjacent random access times may be consecutive or inconsecutive. There is only one optional preamble in one random access time, where the preamble is corresponding to one preamble format. The preamble is also referred to as a random access preamble. A time-domain structure of the preamble includes a cyclic prefix (CP) and a preamble sequence, and the preamble sequence is used to distinguish between user equipments and estimate a timing advance in a random access procedure. Although five preamble formats are defined in the LTE system and CP parameters and time lengths are different in different preamble formats, the network device in the LTE system specifies, by using downlink RACH information, that user equipments in a same cell use preambles of a same preamble format for sending.

Figure 3B:
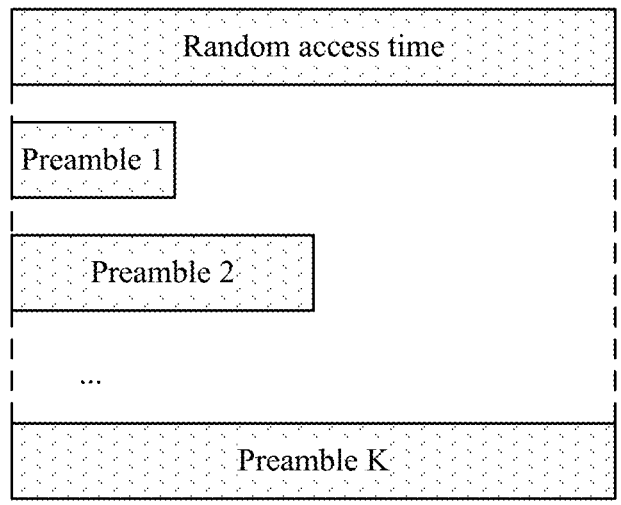
FIG. 3b is a schematic diagram of a random access time according to an embodiment of the present invention.

FIG. 3b is a schematic diagram of a random access time according to an embodiment of the present invention, and may be a schematic diagram of a random access time in a future wireless communications system. As shown in FIG. 3b, there are K optional preambles in one random access time. A preamble format of a preamble m sent in a first random access time may be the same as or different from a preamble format of a preamble n sent in a second random access time. A sequence carried on the preamble m may be the same as or different from a sequence carried on the preamble n. A frequency-domain resource occupied by the preamble m may be the same as or different from a frequency-domain resource occupied by the preamble n. A time-domain location corresponding to the preamble m may be the same as or different from a time-domain location corresponding to the preamble n. That the time-domain location corresponding to the preamble m is the same as the time-domain location corresponding to the preamble n means that the preamble m and the preamble n are targeted for a same receive beam of the network device. For example, a receive beam 1 of the network device may be used to receive four orthogonal frequency division multiplexing (OFDM) symbols, the preamble m may carry two OFDM symbols, and the preamble n may carry two OFDM symbols. The user equipment sends the preamble m to the receive beam 1, and when access performed by using the preamble m fails and the network device detects the preamble m, the receive beam 1 may be further used to receive two OFDM symbols; and the user equipment may still send the preamble n to the receive beam 1. In other words, both the preamble m and the preamble n are targeted for the receive beam 1, and the time-domain location corresponding to the preamble m is the same as the time-domain location corresponding to the preamble n.

Figure 4:
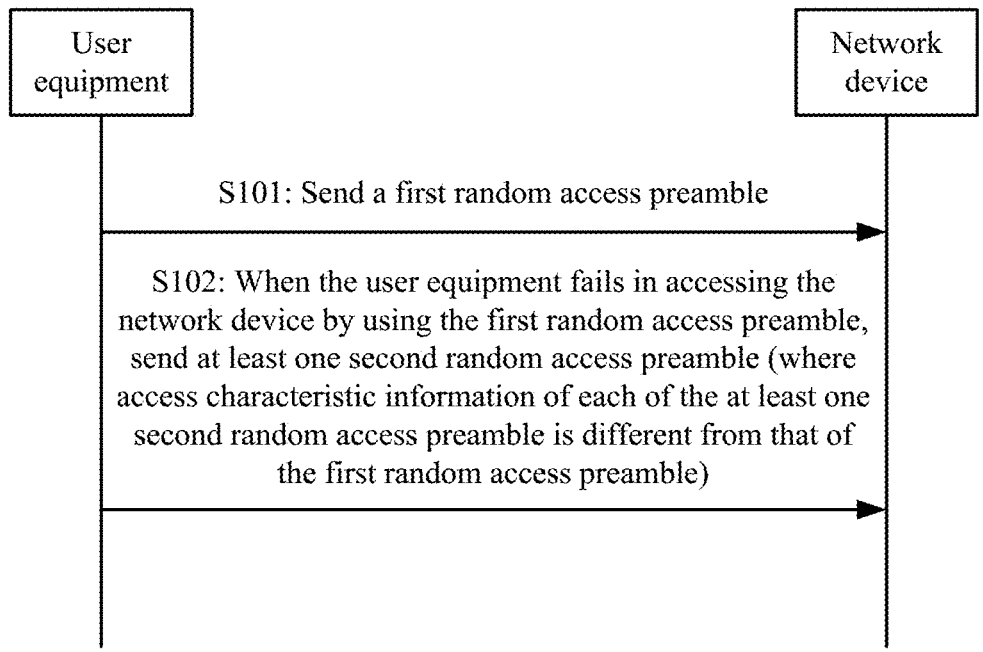
FIG. 4 is a schematic diagram of communication in a random access method according to an embodiment of the present invention.

The following describes a random access method provided in the embodiments of the present invention with reference to FIG. 4 in the embodiments of the present invention.

FIG. 4 is a schematic diagram of communication in a random access method according to an embodiment of the present invention. It should be noted that a network device and user equipment in a cell are used for description in the embodiment shown in FIG. 4. The method described in the embodiment includes but is not limited to the following steps.

Step S101: The user equipment sends a first random access preamble to the network device.

Specifically, before sending the random access preamble to the network device, the user equipment receives a downlink RACH message sent by the network device, where the downlink RACH message is used to notify the user equipment that the user equipment can initiate random access. The downlink RACH message includes random access configuration information. The configuration information may include information such as a preamble initial received target power, a preamble format-based power offset (Delta Preamble), and a power ramping step (Power Ramping Step). Preamble Initial Received Target Power represents an initial power of a random access preamble that the network device expects to receive. The user equipment calculates a transmit power of the random access preamble by using the value, and initiates a random access procedure. Delta Preamble is related to a preamble format, and a value of Delta Preamble may be indicated by using the downlink PACH message or may be obtained through table lookup. Power Ramping Step represents a transmit power increment for next access after each access failure. Preamble Initial Received Target Power, Delta Preamble, and Power Ramping Step may be used by the user equipment to calculate a received target power (PREAMBLE_RECEIVED_TARGET_POWER) of a preamble that the network device expects to receive.

The downlink RACH message is further used to indicate information, such as a preamble format of each preamble, a sequence carried on each preamble, and information indicating whether there is one or more preambles corresponding to a random access time.

In a possible implementation, the user equipment sends the first random access preamble to the network device in a first time, where the first random access preamble is used by the user equipment to access the network device. The time is used to represent a time during which the user equipment may initiate random access, and may be referred to as a random access time or may have another name. A specific value of the random access time is set by the network device. The first time may be understood as the first time during which the user equipment can initiate random access after receiving the downlink RACH message; may be understood as the first or another specific time during which the user equipment can initiate random access after random access fails; or may be understood as any time during which random access can be initiated.

Based on the schematic diagram of the random access time shown in FIG. 3*b*, the first random access preamble is one of the K optional preambles corresponding to the random access time, and is specifically selected by the user equipment. Optionally, the user equipment may select one preamble from a plurality of preambles corresponding to the first time, as the first random access preamble based on the downlink RACH message and a path loss between the user equipment and the network device.

In a possible implementation, the user equipment sends the first random access preamble to the network device for the first time, where the first random access preamble is used by the user equipment to access the user equipment.

The first random access preamble sent by the user equipment to the network device may be received or not be received by the network device. If the network device detects the first random access preamble, the network device sends a random access response specific to the first random access preamble to the user equipment. The random access response includes an index number of the first random access preamble, adjustment information used for uplink time synchronization, an uplink resource allocated for the user equipment, and the like. If the network device detects no first random access preamble, the user equipment cannot receive a random access response specific to the first random access preamble from the network device. In this case, it may be considered that the first random access preamble does not arrive at the network device, and that the user equipment fails in accessing the network device by using the first random access preamble.

Step S102: When the user equipment fails in accessing the network device by using the first random access preamble, the user equipment sends at least one second random access preamble to the network device, where access characteristic information of each of the at least one second random access preamble is different from that of the first random access preamble, and the access characteristic information includes at least one of a time length, a transmit beam, and a random access resource.

Specifically, in the contention-based random access procedure, the user equipment may use the following processes to determine whether the network device is successfully accessed by using the first random access preamble.

(1) The user equipment determines whether the random access response specific to the first random access preamble from the network device is received in a first preset time period; and if no random access response is received, determines that access fails, where the first preset time period is a random access response window (Random Access Response window).

(2) If the random access response is successfully received, the user equipment sends a message 3 to the network device, where the message 3 carries a user equipment identifier.

(3) The user equipment determines whether a message 4 sent by the network device for the message 3 is received in a second preset time period; and if no message 4 is received, determines that access fails, where the second preset time period is a time period corresponding to a medium access control-contention resolution timer (mac-Contention Resolution Timer).

(4) If the user equipment receives the message 4, the user equipment determines whether a user equipment identifier carried in the message 4 is the same as the user equipment identifier, reported to the network device, in the message 3. If the identifiers are the same, the user equipment considers that the user equipment wins this random access contention, and determines that access succeeds; or if the identifiers are different, determines that random access fails.

The process (1) and (2) is also applicable to a non-contention-based random access procedure.

Based on the foregoing processes, that the user equipment fails in accessing the network device by using the first random access preamble may be determined according to the following several cases:

(1) The first random access preamble sent by the user equipment to the network device does not arrive at the network device, and consequently the network device detects no first random access preamble.

(2) The network device detects the first random access preamble and sends the random access response to the user equipment, but the user equipment detects no random access response.

(3) The user equipment detects the random access response and sends the message 3 to the network device, but the network device detects no message 3, an error occurs in detecting the message 3, or a quantity of continuous errors in the message 3 exceeds a maximum quantity of retransmission failures.

(4) The network device detects the message 3 and sends the message 4 to the user equipment, but the user equipment detects no message 4, or the user equipment detects the message 4 but the user equipment identifier carried in the message 4 is different from the user equipment identifier in the message 3.

It can be learnt from the foregoing that if the first random access preamble does not arrive at the network device, random access inevitably fails. In view of this, the user equipment needs to send a random access preamble again. When the user equipment fails in accessing the network device by using the first random access preamble, the user equipment sends at least one second random access preamble to the network device, where the at least one second random access preamble is used by the user equipment to access the network device again. Access characteristic information of each of the at least one second random access preamble is different from that of the first random access preamble, and the access characteristic information includes at least one of a time length, a transmit beam, and a random access resource. It can be determined that the access characteristic information of a second random access preamble is different from that of the first random access preamble, provided that one of these three elements of the second random access preamble is different from that of the first random access preamble.

In a possible implementation, the user equipment sends a second random access preamble A to the network device in a second time. Access characteristic information of the second random access preamble A is different from that of the first random access preamble. For example, a time length of the second random access preamble A is greater than that of the first random access preamble. A time length of the second time is the same as that of the first time. The second time is a time after the user equipment fails in accessing the user equipment by using the first random access preamble, but is unnecessarily a time next to the first time.

Optionally, when the user equipment fails in accessing the network device by using the second random access preamble A, the user equipment sends a second random access preamble B to the network device in a third time. Access characteristic information of the second random access preamble B is different from that of the first random access preamble, and is different from that of the second random access preamble A. For example, the time length of the second random access preamble A is greater than that of the first random access preamble, and a time length of the second random access preamble B is greater than that of the second random access preamble A. The process proceeds until the user equipment successfully accesses the network device or until a quantity of sending times exceeds a maximum allowed quantity of sending times. The maximum allowed quantity of sending times is indicated by the downlink RACH information. Likewise, the third time is a time after the user equipment fails in accessing the user equipment by using the second random access preamble, but is unnecessarily a time next to the second time.

Optionally, before the user equipment determines whether the user equipment successfully accesses the network device by using the second random access preamble A, the user equipment sends at least one second random access preamble to the network device. Specifically, the user equipment sends the second random access preamble B in the third time; sends a second random access preamble C in a fourth time; and so on, until the user equipment successfully accesses the network device or until the quantity of sending times exceeds the maximum allowed quantity of sending times. The maximum allowed quantity of sending times is indicated by the downlink RACH information. This possible implementation may be applied to a scenario in which the user equipment is at a cell edge or signal strength of the user equipment is relatively weak. This possible implementation can effectively reduce an access delay and increase a random access success rate. It can be understood that when the user equipment does not determine whether the user equipment accesses the network device by using the second random access preamble, the user equipment sends the second random access preamble B to the network device in the third time. In this case, the third time is a time next to the second time. For example, if the random access channel time is 10 ms and the second time is a time from the $11^{th}$ millisecond to the $20^{th}$ millisecond, the third time is a time from the $21^{st}$ millisecond to the $30^{th}$ millisecond. In the time from the $21^{st}$ millisecond to the $30^{th}$ millisecond, the user equipment sends the third random access preamble to the network device. In this possible implementation, the downlink RACH information is used for configuration. To be specific, the network device configures the capability for the user equipment; or the user equipment has the capability, and the downlink RACH information is used to instruct the user equipment to activate the capability.

In a possible implementation, the user equipment sends a second random access preamble A to the network device for the second time. Access characteristic information of the second random access preamble A is different from that of the first random access preamble. For example, a time length of the second random access preamble A is greater than that of the first random access preamble.

When the user equipment fails in accessing the network device by using the second random access preamble A, the user equipment sends a second random access preamble B to the network device for the third time. Access characteristic information of the second random access preamble B is different from that of the first random access preamble, and is different from that of the second random access preamble A. For example, the time length of the second random access preamble A is greater than that of the first random access preamble, and a time length of the second random access preamble B is greater than that of the second random access preamble A. The process proceeds until the user equipment successfully accesses the network device or until a quantity of sending times exceeds a maximum allowed quantity of sending times. The maximum allowed quantity of sending times is indicated by the downlink RACH information.

In a possible implementation, the user equipment sends at least one second random access preamble to the network device for the second time, where access characteristic information of each of the at least one second random access preamble is different from that of the first random access preamble. This possible implementation can effectively reduce an access delay and increase a random access success rate.

In the foregoing several possible implementations, a quantity of the at least one second random access preamble may be indicated by the downlink RACH information, to avoid contention caused by an excessively large quantity of the at least one second random access preamble.

If a time length of each second random access preamble is different from that of the first random access preamble, the time length of each second random access preamble is greater than that of the first random access preamble. For example, the time length of the first random access preamble is 1 ms, and the time length of the second random access preamble A is 2 ms; therefore, for the network device, energy of the second random access preamble A is higher, so that the network device receives the second random access preamble A more easily. This increases a probability that the random access preamble arrives at the network device and increases a random access success rate.

Optionally, the user equipment selects a preamble whose time length is greater than that of the first random access preamble, and uses the preamble as the second random access preamble A. A difference between the time lengths of the first random access preamble and the second random access preamble is not specifically limited. Optionally, the user equipment adds or prolongs the time length of the first random access preamble based on the first random access preamble, to obtain the second random access preamble A. An addition multiple and a prolonged length are not limited. For example, assuming that the time length of the first random access preamble is 1 ms, the time length is added by one time to obtain a preamble whose time length is 2 ms, and the preamble is determined as the second random access preamble A.

It should be noted that an allowed time length of a random access preamble in the random access procedure is limited. To be specific, there is a time length threshold, and a time length is not increased any longer once the time length reaches the time length threshold. A specific value of the time length threshold may be set by the network device, and the network device may notify the user equipment of the specific value by using downlink system information or RACH information.

If a transmit beam of each second random access preamble is different from that of the first random access preamble, a random access resource of each second random access preamble is the same as or different from that of the first random access preamble. Transmit beams of any two of the at least one second random access preamble are the same or different.

If the random access resource of each second random access preamble is different from that of the first random access preamble, a transmit beam of each second random access preamble is the same as or different from that of the first random access preamble. Random access resources of any two of the at least one second random access preamble are the same or different.

The transmit power of each second random access preamble is the same as or different from that of the first random access preamble, and transmit powers of any two of the at least one second random access preamble are the same or different.

Optionally, a sequence carried on the first random access preamble is different from a sequence carried on the second random access preamble.

Optionally, a frequency-domain resource occupied by the first random access preamble is the same as or different from a frequency-domain resource occupied by the second random access preamble. That the frequency-domain resources are the same means that quantities of occupied subcarriers are the same and locations of the occupied subcarriers are the same.

In a possible implementation, the user equipment sends the at least one second random access preamble to the network device based on priorities of the time length, the transmit power, the transmit beam, and the random access resource. It may be understood that priority-based sorting is performed on these four elements: the time length, the transmit power, the transmit beam, and the random access resource. After access performed by using a random access preamble with one element changed fails, a random access preamble with another element of a higher priority changed is selected for sending. For example, a sequence of the priorities of these four elements in descending order is the transmit beam, the random access resource, the transmit power, and the time length. When access performed by using the first random access preamble fails, the second random access preamble A whose transmit beam is different from that of the first random access preamble (the other three elements of the second random access preamble A may be the same as those of the first random access preamble) is selected; when access performed by using the second random access preamble A fails, the second random access preamble B whose random access resource is different from that of the first random access preamble or different from that of the second random access preamble A is selected for sending; and the process proceeds until access succeeds or until a maximum quantity of sending times is reached. A transmit beam of the second random access preamble B is the same as or different from that of the second random access preamble A.

Optionally, priority-based sorting is performed on combinations of at least two of these four elements. To be specific, after access performed by using a random access preamble with a combination changed fails, a random access preamble with a combination of a higher priority changed is selected for sending.

Optionally, after access performed by using a random access preamble with one element changed fails, a random access preamble with at least two of these four elements changed are selected for sending.

In the embodiment shown in FIG. 4, a random access preamble whose access characteristic information is different from that of a previous random access preamble is sent, to resolve a problem of a random access failure in a future wireless communications network caused by the fact that a random access preamble does not arrive at the network device, thereby increasing a probability that the random access preamble arrives at the network device and increasing a random access success rate.

FIG. 5a to FIG. 5e are schematic diagrams of examples of five random access manners according to the embodiments of the present invention. In FIG. 5a to FIG. 5e, horizontal stripes are used to represent a random access preamble sent by user equipment, and cross stripes are used to represent a random access preamble received by a network device. The following separately describes the five manners. It is assumed that a quantity of sending times is three and that the network device can detect the random access preamble sent by the user equipment.

Figure 5A:
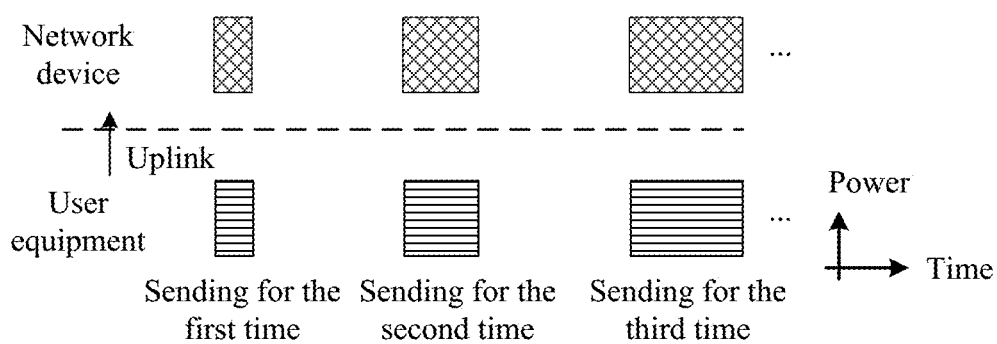
FIG. 5a is a schematic diagram of an example of a random access manner 1 according to an embodiment of the present invention.

Manner 1: Referring to FIG. 5a, the user equipment performs sending for the first time to send a first random access preamble to the network device; after access performed by using the first random access preamble fails, performs sending for the second time to send a second random access preamble to the network device; and after access performed by using the second random access preamble fails, performs sending for the third time to send a third random access preamble to the network device. A time length of the third random access preamble is greater than a time length of the second random access preamble, the time length of the second random access preamble is greater than a time length of the first random access preamble, and transmit powers for the three times of sending are the same. It is assumed that the transmit power is P. A method for calculating P is not limited herein. Optionally, a calculation formula of the transmit power P is:

$$P = \min\{P_{CMAX}(i), \text{PREAMBLE\_RECEIVED\_TARGET\_POWER} + PL\}, \text{ where}$$

a unit of P is dBm; $P_{CMAX}(i)$ represents a maximum allowed transmit power of the user equipment corresponding to the $i^{th}$ subframe and is measured in dBm; PL represents a path loss (Path Loss) between the user equipment and the network device estimated by the user equipment and is measured in dB; PREAMBLE_RECEIVED_TARGET_POWER is a received target power of a preamble that the network device expects to receive, and is specified by a media access control (Media Access Control, MAC) layer as Preamble Initial Received Target Power; and Preamble Initial Received Target Power is specified by using a downlink RACH message sent by the network device.

Figure 5B:
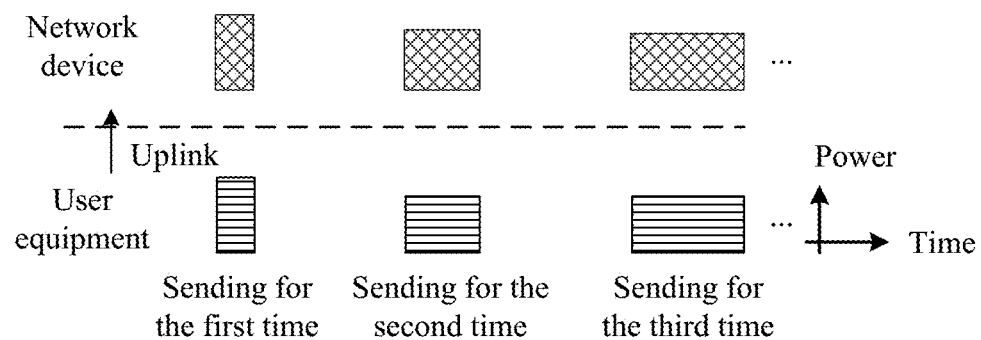
FIG. 5b is a schematic diagram of an example of a random access manner 2 according to an embodiment of the present invention.

Manner 2: As shown in FIG. 5b, different from Manner 1, in Manner 2, transmit powers for sending a random access preamble are different, a transmit power for the second time is less than that for the first time, and a transmit power for the third time is less than that for the second time. A transmit power P1 of the first random access preamble is calculated by the user equipment based on a path loss and a downlink RACH message, and a difference between transmit powers of the second random access preamble and the first random access preamble is calculated based on the downlink RACH message. Specific calculation manners are not limited herein. Optionally, a time length of a $k^{th}$ random access preamble that is sent for the $k^{th}$ time is $T_k$, and a transmit power $P_k$ of the $k^{th}$ random access preamble may be calculated according to the following formula:

$$P_k = \min\{P_{CMAX}(i), \text{PREAMBLE\_RECEIVED\_TARGET\_POWER} + PL\}, \text{ where}$$

a unit of $P_k$ is dBm; $P_{CMAX}(i)$ represents a maximum allowed transmit power of the user equipment corresponding to the $i^{th}$ subframe and is measured in dBm; PL represents a path loss between the user equipment and the network device estimated by the user equipment and is measured in dB; PREAMBLE_RECEIVED_TARGET_POWER is a received target power of a preamble that the network device expects to receive, and is specified by a MAC layer as "Preamble Initial Received Target Power−10 log $10(T_k/T_1)$+(k−1)×Power Ramping Step"; PREAMBLE_TRANSMISSION_COUNTER is a quantity of retransmission times; Power Ramping Step represents a transmit power increment for next access after each access failure, and is specified by using a downlink RACH message; and Preamble Initial Received Target Power is specified by using the downlink RACH message.

Figure 5C:
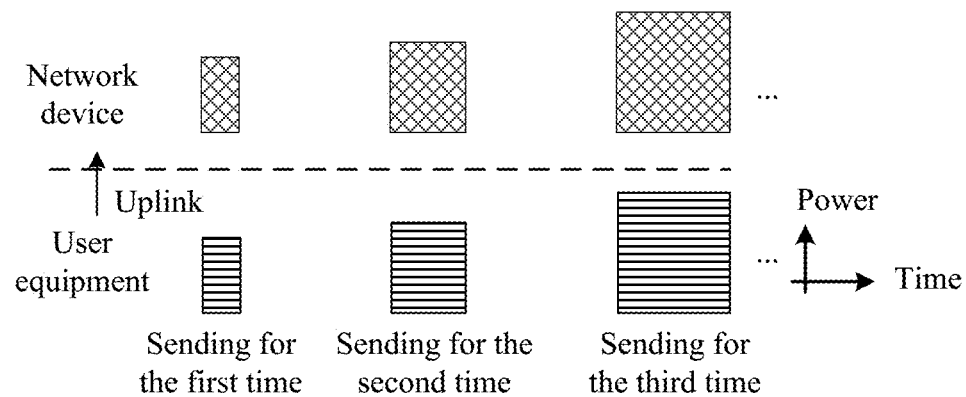
FIG. 5c is a schematic diagram of an example of a random access manner 3 according to an embodiment of the present invention.

Manner 3: As shown in FIG. 5c, different from Manner 1, in Manner 3, transmit powers for sending a random access preamble are different, a transmit power for the second time is greater than that for the first time, and a transmit power for the third time is greater than that for the second time. An access failure caused by an excessively large distance between the user equipment and the network device can be avoided by increasing a transmit power.

Figure 5D:
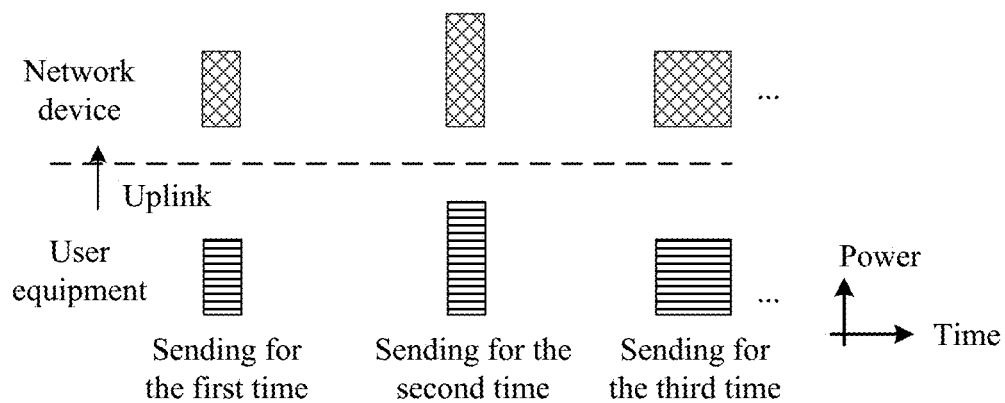
FIG. 5d is a schematic diagram of an example of a random access manner 4 according to an embodiment of the present invention.

Manner 4: As shown in FIG. 5d, a time length of a second random access preamble sent for the second time is the same as that of a first random access preamble sent for the first time; a transmit power of the second random access preamble is higher than that of the first random access preamble; a transmit power of a third random access preamble sent for the third time is the same as that of the first random access preamble sent for the first time; and a time length of the third random access preamble is greater than that of the first random access preamble. In Manner 4, a transmit power is first increased for access, and if access fails after the transmit power is increased, a random access preamble with a longer time length is selected for access, to increase an access success rate.

Figure 5E:
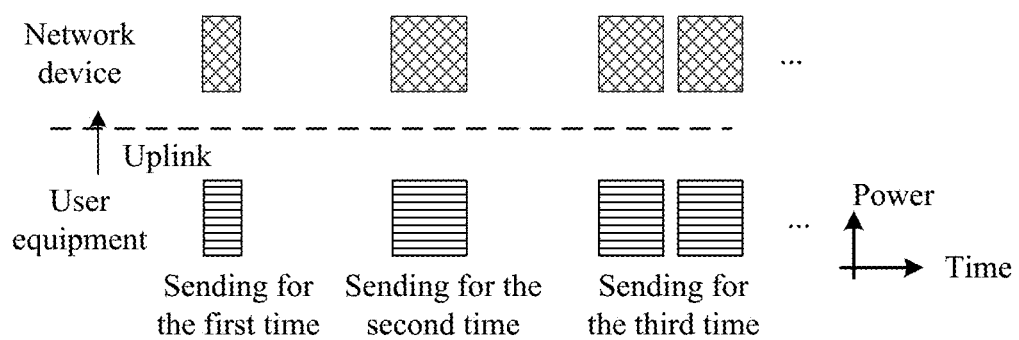
FIG. 5e is a schematic diagram of an example of a random access manner 5 according to an embodiment of the present invention.

Manner 5: As shown in FIG. 5e, different from Manner 1, in Manner 5, a total time length of random access preambles sent for the third time is longer and sending time points are inconsecutive.

It should be noted the foregoing five access manners are implemented in a scenario in which random access preambles are sent for a plurality of times based on a same transmit beam and a same random access resource. In the foregoing five access manners, if access to the network device by using the random access preamble sent for the third time fails, a random access preamble is sent for the fourth time, and the process proceeds until access succeeds or until a quantity of sending times exceeds a maximum allowed quantity of sending times. A time length of the random access preamble sent for the fourth time may be greater than that of the random access preamble sent for the third time, and a transmit power of the random access preamble sent for the fourth time is higher than that of the random preamble sent for the third time. Alternatively, a time length of the random access preamble sent for the fourth time is the same as that of the random access preamble sent for the third time, and a transmit power of the random access preamble sent for the fourth time is higher than that of the random preamble sent for the third time. Alternatively, a time length of the random access preamble sent for the fourth time is greater than that of the random access preamble sent for the third time, and a transmit power of the random access preamble sent for the fourth time is the same as that of the random preamble sent for the third time. Alternatively, a total time length of the random access preambles sent for the fourth time is greater than that of the random access preambles sent for the third time, and a transmit power of the random access preamble sent for the fourth time is the same as or greater than that of the random preamble sent for the third time.

Development of mobile services poses increasingly high requirements on a data rate and efficiency of wireless communication. In a future wireless communications system, a beamforming technology is used to limit energy of a transmission signal within a specific beam direction, to increase signal sending and receiving efficiency. The beamforming technology can effectively expand a wireless signal transmission range and reduce signal interference, thereby achieving higher communication efficiency and obtaining a higher network capacity.

Figure 6:
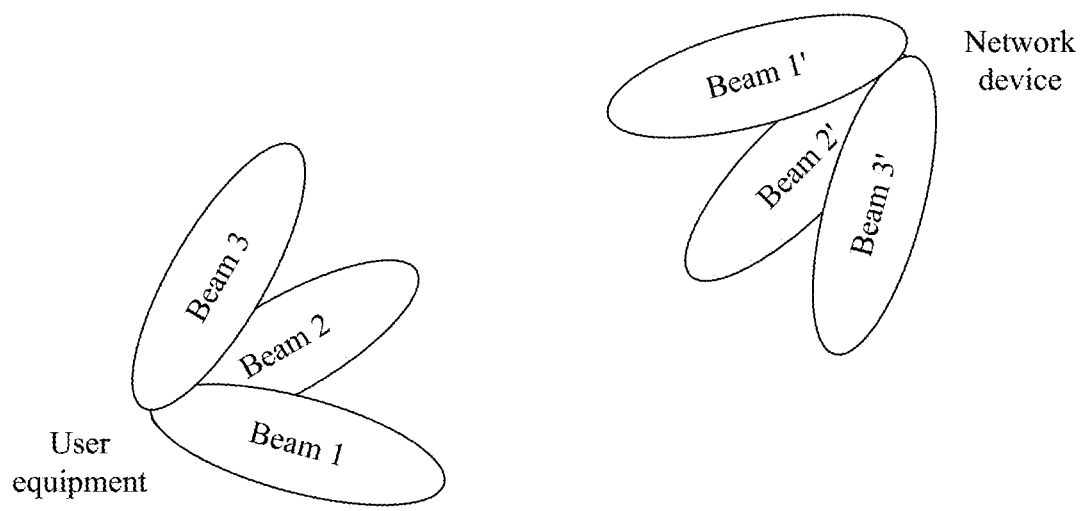
FIG. 6 is a schematic diagram of beams according to an embodiment of the present invention.

However, in a communications network in which the beamforming technology is used, both the base station and the user equipment may transmit signals by using a plurality of beams. FIG. 6 is a schematic diagram of beams according to an embodiment of the present invention. In a case of uplink access, the user equipment may perform sending by using three transmit beams and the network device may perform receiving by using three receive beams. A quantity of beams shown in FIG. 6 does not constitute any limitation on this embodiment of the present invention, and a specific quantity depends on a specific case.

In a communication process, a transmit beam first needs to be matched with a receive beam, so that a gain from the transmit end to the receive end is maximized. Otherwise, relatively high communication efficiency cannot be achieved. In addition, to implement full coverage, the base station is required to perform beam scanning. Therefore, when the user equipment and the base station establish an uplink connection and a downlink connection, respectively, beam scanning needs to be performed to obtain an optimal transmit-receive beam pair. Further, when the user equipment performs the uplink connection through random access, impact made by the fact that a transmit beam and a receive beam do not match needs to be considered. In other words, if the transmit beam of the user equipment and the receive beam of the base station do not match, random access may fail. As shown in FIG. 6, assuming that a transmit beam 2 of the user equipment and a receive beam 2' of the network device are an optimal transmit-receive beam pair but the user equipment sends a signal for the receive beam 2' by using a transmit beam 1, random access may fail.

A random access retransmission method in the LTE system does not support multi-beam scanning, and consequently cannot satisfy a requirement for the future wireless communications system. In view of this, random access preambles in this embodiment of the present invention may be sent by using different transmit beams, or may be sent by using a same transmit beam; and the random access preambles may be targeted for different receive beams, or may be targeted for a same receive beam, so as to make a transmit beam and a receive beam match each other as far as possible, thereby increasing a random access success rate. It may be assumed that the five access manners shown in FIG. 5a to FIG. 5e are implemented when a transmit beam and a receive beam match each other. If a transmit beam and a receive beam do not match from the very beginning, the user equipment needs to perform beam scanning, change the transmit beam and/or the receive beam, and attempt random access, to determine a transmit beam and a receive beam that match each other. In a possible implementation, a receive beam of the network device is corresponding to a random access resource, or a time-domain location (for example, in FIG. 7c, two receive beams B2 and B3 are adjacent in terms of time, and time-domain locations are denoted as t1 to t4; if no "beam" is defined for the network device, different receive beams are distinguished by using time-domain locations; to be specific, the receive beam B2 occupies t1 and t2, and the receive beam B3 occupies t3 and t4), or a frequency-domain location.

Figure 7A:
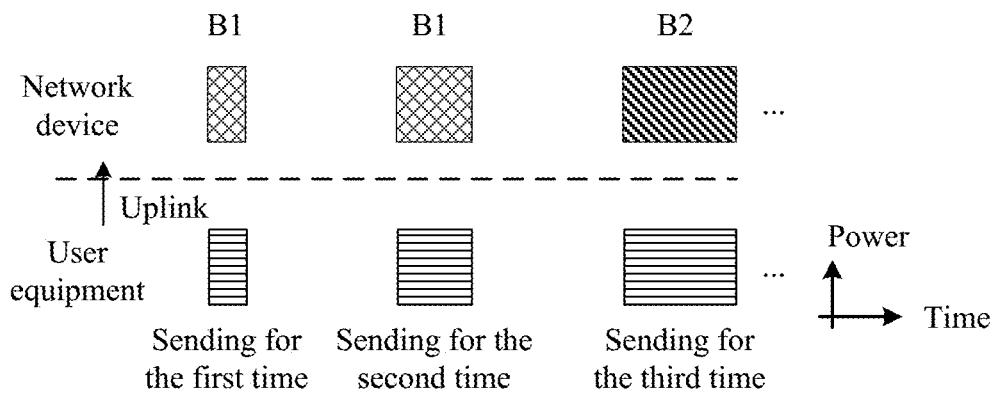
FIG. 7a is a schematic diagram of an example of a random access manner for different receive beams according to an embodiment of the present invention.
Figure 7B:
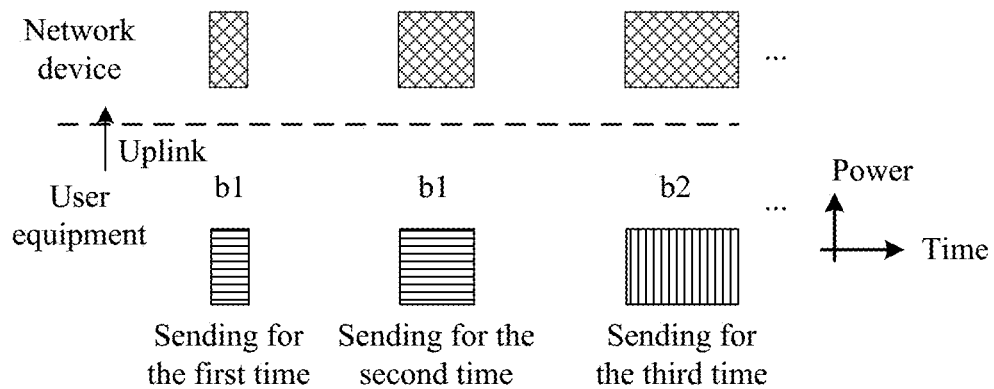
FIG. 7b is a schematic diagram of an example of a random access manner for different transmit beams according to an embodiment of the present invention.
Figure 7C:
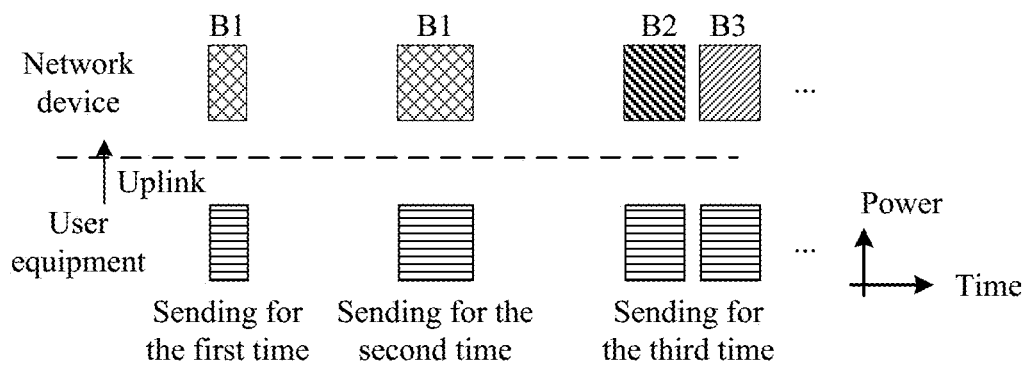
FIG. 7c is another schematic diagram of an example of a random access manner for different receive beams according to an embodiment of the present invention.
Figure 7D:
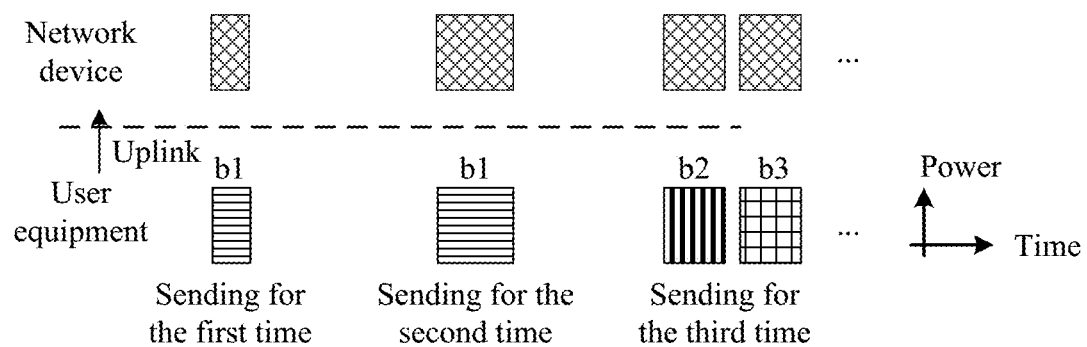
FIG. 7d is another schematic diagram of an example of a random access manner for different transmit beams according to an embodiment of the present invention.

The following separately describes changing of a receive beam and a transmit beam with reference to FIG. 7a and FIG. 7d.

FIG. 7a is a schematic diagram of an example of a random access manner for different receive beams according to an embodiment of the present invention. As shown in FIG. 7a, the user equipment performs sending for the first time to send a first random access preamble for a receive beam B1 of the network device at a transmit power $P_1$. After access performed by using the first random access preamble fails, the user equipment performs sending for the second time to send a second random access preamble whose time length is greater than that of the first random access preamble, for the receive beam B1 of the network device at the transmit power $P_1$. After access performed by using the second random access preamble fails, the user equipment performs sending for the third time to send, to the network device, a third random access preamble whose time length is greater than that of the second random access preamble, for a receive beam B2 of the network device at a transmit power $P_2$. $P_1$ and $P_2$ are calculated by the user equipment based on a path loss and a downlink RACH message, and may be the same or different. In other words, when access performed by using a random access preamble with a longer time length fails, the user equipment may change the receive beam, to send a random access preamble whose time length is greater than a random access preamble sent at a previous time. Optionally, a path loss corresponding to the transmit power $P_1$ is obtained based on the first receive beam B1 that is sent by the network device to the user equipment, and a path loss corresponding to the transmit power $P_2$ is obtained based on the second receive beam B2 that is sent by the network device to the user equipment. Optionally, the user equipment may change the receive beam, to send a random access preamble with a higher transmit power. Optionally, the user equipment may change the receive beam, to send a random access preamble with a longer time length and a higher transmit power than those of a random access preamble sent at a previous time.

It should be noted that FIG. 7a shows two types of receive beams (B1 and B2, respectively corresponding to cross stripes and oblique stripes) and one type of transmit beam (corresponding to horizontal stripes). To be specific, the random access manner is for different receive beams and a same transmit beam.

Optionally, the user equipment may determine, based on a spatial location relationship between receive beams, whether to change the receive beam. For example, a receive beam 2 is spatially adjacent to a receive beam 1; therefore, after access performed by using a random access preamble for the receive beam 1 fails, a random access preamble for the receive beam 2 is sent. Optionally, the user equipment may determine, based on receiving quality of receive beams, whether to change the receive beam. For example, the user equipment determines that the receive beam 2 may have better receiving quality than the receive beam 1; therefore, after access performed by using the random access preamble for the receive beam 1 fails, the random access preamble for the receive beam 2 is sent.

FIG. 7b is a schematic diagram of an example of a random access manner for different transmit beams according to an embodiment of the present invention. As shown in FIG. 7b, the user equipment performs sending for the first time based on a transmit beam b1, to send a first random access preamble at a transmit power $P_1$. After access performed by using the first random access preamble fails, the user equipment performs sending for the second time based on the transmit beam b1, to send, at the transmit power $P_1$, a second random access preamble whose time length is greater than that of the first random access preamble. After access performed by using the second random access preamble fails, the user equipment performs sending for the third time based on a transmit beam b2, to send, to the network device at a transmit power $P_2$, a third random access preamble whose time length is greater than that of the second random access preamble. $P_1$ and $P_2$ are calculated by the user equipment based on a path loss and a downlink RACH message, and may be the same or different. In other words, when access performed by using a random access preamble with a longer time length fails, the user equipment may change the transmit beam, to send a random access preamble whose time length is greater than a random access preamble sent at a previous time. Optionally, the user equipment may change the transmit beam, to send a random access preamble with a higher transmit power. Optionally, the user equipment may change the transmit beam, to send a random access preamble with a longer time length and a higher transmit power than those of a random access preamble sent at a previous time.

It should be noted that FIG. 7b shows two types of transmit beams (b1 and b2, respectively corresponding to horizontal stripes and vertical stripes) and one type of receive beam (corresponding to cross stripes). To be specific, the random access manner is for different transmit beams and a same receive beam.

Optionally, when access performed by using a random access preamble with a longer time length fails, the user equipment may change both the transmit beam and the receive beam.

Optionally, the user equipment may choose, based on a spatial location relationship between transmit beams, whether to change the transmit beam. For example, a transmit beam 2 is spatially adjacent to a transmit beam 1; therefore, after access performed by using a random access preamble for the transmit beam 1 fails, a random access preamble for the transmit beam 2 is sent. Optionally, the user equipment may determine, based on transmission quality of transmit beams, whether to change the transmit beam. For example, the user equipment determines that the transmit beam 2 may have better transmission quality than the transmit beam 1; therefore, after access performed by using the random access preamble for the transmit beam 1 fails, the random access preamble for the transmit beam 2 is sent.

FIG. 7c is another schematic diagram of an example of a random access manner for different receive beams according to an embodiment of the present invention. Different from FIG. 7a, herein sending of a random access preamble for the third time is performed by using two receive beams of the network device, a total time length is greater than that for performing sending for the second time, and two sending time points are inconsecutive. A time width of a specific interval between the two sending time points may be learnt by the user equipment from PACH information. It should be noted that sending of the random access preamble for the third time is not limited to be performed by using two receive beams of the network device, and may be performed by using more receive beams.

FIG. 7d is another schematic diagram of an example of a random access manner for different transmit beams according to an embodiment of the present invention. Different from FIG. 7b, herein sending of a random access preamble for the third time is performed by using two transmit beams of the user equipment, a total time length is greater than that for performing sending for the second time, and two sending time points are inconsecutive. A time width of a specific interval between the two sending time points may be learnt by the user equipment from PACH information. It should be noted that sending of the random access preamble for the third time is not limited to be performed by using two transmit beams of the user equipment, and may be performed by using more transmit beams.

Four random access manners shown in FIG. 7a to FIG. 7d are based on FIG. 5a. To be specific, a transmit power is unchanged, and a random access preamble with a longer time length is selected for random access. It should be noted that the five random access manners shown in FIG. 5a to FIG. 5e may be freely combined with the four random access manners shown in FIG. 7a to FIG. 7d. For example, the random access manner shown in FIG. 7a is combined with the random access manner shown in FIG. 5c. To be specific, a receive beam is changed, a transmit power is increased, and a random access preamble with a longer time length is selected for random access.

The foregoing describes in detail the method according to the embodiments of the present invention, and the following provides apparatuses according to the embodiments of the present invention.

Figure 8:
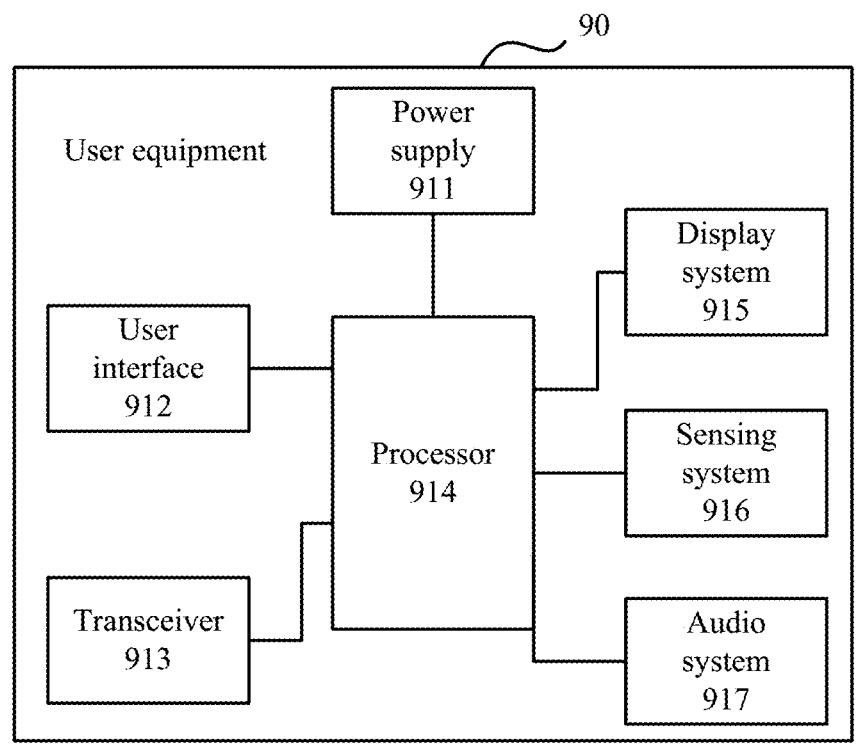
FIG. 8 is a schematic structural diagram of user equipment according to an embodiment of the present invention.

FIG. 8 is a schematic structural diagram of user equipment according to an embodiment of the present invention. The user equipment 90 may include a transceiver 913.

The transceiver 913 is configured to send a first random access preamble to a network device, where the first random access preamble is used by the user equipment to access the network device.

The transceiver 913 is further configured to: when the user equipment fails in accessing the network device by using the first random access preamble, send at least one second random access preamble to the network device, where access characteristic information of each of the at least one second random access preamble is different from that of the first random access preamble, the access characteristic information includes at least one of a time length, a transmit beam, and a random access resource, and the at least one second random access preamble is used by the user equipment to access the network device.

Optionally, access characteristic information of any two of the at least one second random access preamble is different.

Optionally, if a time length of each second random access preamble is different from that of the first random access preamble, the time length of each second random access preamble is greater than that of the first random access preamble.

Optionally, if a transmit beam of each second random access preamble is different from that of the first random access preamble, a random access resource of each second random access preamble is the same as or different from that of the first random access preamble.

Optionally, if a random access resource of each second random access preamble is different from that of the first random access preamble, a transmit beam of each second random access preamble is the same as or different from that of the first random access preamble.

Optionally, a transmit power of each second random access preamble is the same as or different from that of the first random access preamble, and transmit powers of any two of the at least one second random access preamble are the same or different.

The transceiver 913 is specifically configured to send the at least one second random access preamble to the network device based on priorities of the time length, the transmit power, the transmit beam, and the random access resource.

It should be noted that the transceiver 913 is configured to perform step S101 and step S102 in the embodiment shown in FIG. 4, and is further configured to implement communication or data transmission between the user equipment 90 and the network device such as a satellite.

The transceiver 913 may be alternatively a transceiver circuit, a communications module, or the like. The user equipment 90 further includes a processor 914, a power supply 911, a user interface 912, a display system 915, a sensing system 916, and an audio system 917. It should be noted that the user equipment 90 may represent the user equipment shown in FIG. 4, and a structure of the user equipment shown in FIG. 8 does not constitute any limitation on this embodiment of the present invention.

The processor 914 may be a central processing unit (CPU), a general-purpose processor, a digital signal processor (DSP), an application-specific integrated circuit (ASIC), a field-programmable gate array (FPGA), or another programmable logic device, a transistor logic device, a hardware component, or a combination thereof. The processor 914 may implement or execute various example logical blocks, modules, and circuits described with reference to content disclosed in the present invention. Alternatively, the processor may be a combination implementing a computing function, for example, a combination including one or more microprocessors, or a combination of a DSP and a microprocessor.

The power supply 911 provides a power assurance for implementing various functions of the user equipment 90. The user interface 912 is configured to connect the user equipment 90 and another device or apparatus, to implement communication or data transmission between the another device or apparatus and the user equipment 90. The display system 915 is configured to output and display information and receive an operation input by a user. The sensing system 916 includes various sensors, for example, a temperature sensor and a proximity sensor. The audio system 917 is configured to output an audio signal.

Figure 9:
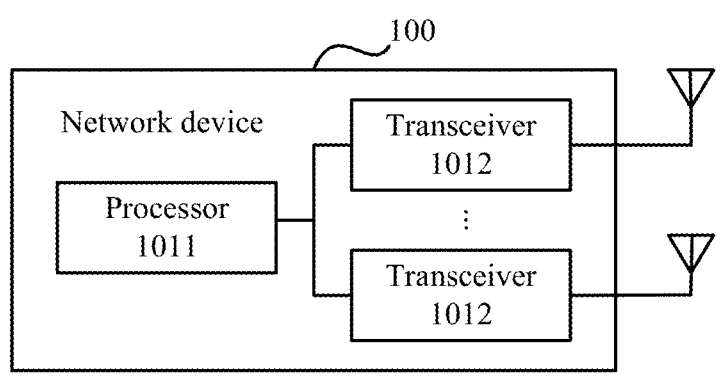
FIG. 9 is a schematic structural diagram of a network device according to an embodiment of the present invention.

FIG. 9 is a schematic structural diagram of a network device according to an embodiment of the present invention. The network device 100 may include a transceiver 1012.

The transceiver 1012 is configured to send a first random access preamble to the network device, where the first random access preamble is used by user equipment to access the network device.

The transceiver 1012 is further configured to: when the user equipment fails in accessing the network device by using the first random access preamble, send at least one second random access preamble to the network device, where access characteristic information of each of the at least one second random access preamble is different from that of the first random access preamble, the access characteristic information includes at least one of a time length, a transmit beam, and a random access resource, and the at least one second random access preamble is used by the user equipment to access the network device.

The transceiver 1012 is further configured to send downlink RACH information to the user equipment.

It should be noted that when the network device 100 receives the first random access preamble but the user equipment fails in performing access by using the first random access preamble, the transceiver 1012 performs the foregoing process. In actual application, the network device 100 may receive the first random access preamble or may not receive the first random access preamble; and may receive the second random access preamble or may not receive the second random access preamble. However, the network device 100 may receive, from the user equipment, random access preambles of different time lengths, random access preambles of different preamble formats, and random access preambles of different transmit powers.

The network device 100 further includes a processor 1011 and antennas. It should be noted that in actual application, a quantity of transceivers 1012 is not limited to two, a quantity of antennas is not limited to two either, and a structure of the network device 100 does not constitute any limitation on this embodiment of the present invention.

The processor 1011 mainly includes four components: a cell controller, a voice channel controller, a signaling channel controller, and a plurality of interfaces that have been added. The processor 1011 is responsible for management of all mobile communications interfaces, including mainly radio channel allocation, release, and management. The transceiver 1012 includes a receiver and a transmitter. For the user equipment, the transmitter may be used for transmitting uplink data, and the receiver may be used for receiving downlink data.

An embodiment of the present invention further provides a computer storage medium, configured to store a computer software instruction used by the foregoing user equipment. The computer software instruction includes a program designed for executing the foregoing aspects.

An embodiment of the present invention further provides a computer storage medium, configured to store a computer software instruction used by the foregoing network device. The computer software instruction includes a program designed for executing the foregoing aspects.

It should be noted that, for brief description, the foregoing method embodiments are represented as a series of actions. However, a person skilled in the art should appreciate that the present invention is not limited to the described order of the actions, because according to the present invention, some steps may be performed in other orders or simultaneously. In addition, a person skilled in the art should also appreciate that all the embodiments described in the specification are preferred embodiments, and the related actions and modules are not necessarily mandatory to the present invention.

In the foregoing embodiments, the description of each embodiment has respective focuses. For a part that is not described in detail in an embodiment, reference may be made to related descriptions in other embodiments.

A sequence of the steps of the method in the embodiments of the present invention may be adjusted, and some steps may be combined or removed depending on an actual requirement.

The units in the apparatus in the embodiments of the present invention may be combined, divided, and deleted depending on an actual requirement. A person skilled in the art may integrate or combine different embodiments or features of different embodiments described in this specification.

With descriptions of the foregoing implementations, a person skilled in the art may clearly understand that the present invention may be implemented by hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium that can be accessed by a computer. The following is used as an example but is not limited: The computer-readable medium may include a random access memory (Random Access Memory, RAM), a read-only memory (ROM), an electrically erasable programmable read-only memory (EEPROM), a compact disc read-only memory (CD-ROM) or other optical disk storage, a magnetic disk storage medium or another magnetic storage device, or any other medium that can be used to carry or store expected program code in an instruction or data structure form and that can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL), or wireless technologies such as infrared ray, radio, and microwave, the coaxial cable, optical fiber/cable, twisted pair, DSL, or wireless technologies such as infrared ray, radio, and microwave are included in fixation of a medium to which they belong. For example, a disk and disc used by the present invention includes a compact disc (CD), a laser disc, an optical disc, a digital versatile disc (DVD), a floppy disk, and a Blu-ray disc, where the disk generally copies data magnetically, and the disc copies data optically by using a laser. The foregoing combination should also be included in the protection scope of the computer-readable medium.

In summary, what is described above is merely example embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A random access preamble sending method, comprising:
    sending, by a user equipment, a first random access preamble to a network device, wherein the first random access preamble is used by the user equipment to access the network device; and
    in response to the user equipment failing to access the network device using the first random access preamble, sending, by the user equipment, at least one second random access preamble to the network device, wherein access characteristic information of each of the at least one second random access preamble is different from access characteristic information of the first random access preamble, and the access characteristic information comprises elements of a time length, a transmit power, a transmit beam, and a random access resource, and the at least one second random access preamble is used by the user equipment to access the network device, and wherein the elements of the time length, the transmit power, the transmit beam, and the random access resource each have a respective priority, and wherein a sequence of priorities of the elements in descending order is the transmit beam, the random access resource, the transmit power, and the time length, and wherein a difference between the access characteristic information of the at least one second random access preamble and the access characteristic information of the first random access preamble is determined based on the access characteristic information with the highest priority.

2. The method according to claim 1, wherein access characteristic information of each one of the at least one second random access preamble is different from each other one of the at least one second random access preamble.

3. The method according to claim 1, wherein if a time length of each one of the at least one second random access preamble is different from the time length of the first random access preamble, the time length of each one of the at least one second random access preamble is greater than the time length of the first random access preamble.

4. The method according to claim 1, wherein if a transmit beam of each one of the at least one second random access preamble is different from the transmit beam of the first random access preamble, a random access resource of each one of the at least one second random access preamble is the same as or different from the random access resource of the first random access preamble.

5. The method according to claim 1, wherein if a random access resource of each one of the at least one second random access preamble is different from the random access resource of the first random access preamble, a transmit beam of each one of the at least one second random access preamble is the same as or different from the transmit beam of the first random access preamble.

6. The method according to claim 1, wherein a transmit power of each one of the at least one second random access preamble is the same as or different from the transmit power of the first random access preamble, and transmit powers of any two of the at least one second random access preamble are the same or different from each other.

7. A user equipment comprising:
    a processor; and
    a transceiver;
    wherein the transceiver, in coordination with the processor, is configured to send a first random access preamble to a network device, wherein the first random access preamble is used by the user equipment to access the network device; and
    the transceiver, in coordination with the processor is further configured to: in response to the user equipment failing to access the network device by using the first random access preamble, send at least one second random access preamble to the network device, wherein access characteristic information of each of the at least one second random access preamble is different from access characteristic information of the first random access preamble, and the access characteristic information comprises elements of a time length, a transmit power, a transmit beam, and a random access resource, and the at least one second random access preamble is used by the user equipment to access the network device, and wherein the elements of the time length, the transmit power, the transmit beam, and the random access resource each have a respective priority, and wherein a sequence of priorities of the elements in descending order is the transmit beam, the random access resource, the transmit power, and the time length, and wherein a difference between the access characteristic information of the at least one second random access preamble and the access characteristic information of the first random access preamble is determined based on the access characteristic information with the highest priority.

8. The user equipment according to claim 7, wherein access characteristic information of any two of the at least one second random access preamble is different from any other one of the at least one second random access preamble.

9. The user equipment according to claim 7, wherein if a time length of each one of the at least one second random access preamble is different from the time length of the first random access preamble, the time length of each one of the at least one second random access preamble is greater than the time length of the first random access preamble.

10. The user equipment according to claim 7, wherein if a transmit beam of each one of the at least one second random access preamble is different from the transmit beam of the first random access preamble, a random access resource of each one of the at least one second random access preamble is the same as or different from that of the first random.

11. The user equipment according to claim 7, wherein if a random access resource of each one of the at least one second random access preamble is different from the random access resource of the first random access preamble, a transmit beam of each one of the at least one second random access preamble is the same as or different from the random access resource of the first random access preamble.

12. The user equipment according to claim 7, wherein a transmit power of each one of the at least one second random access preamble is the same as or different from the transmit beam of the first random access preamble, and transmit powers of any two of the at least one second random access preamble are the same or different.

13. A non-transitory computer-readable medium storing executable instructions, which when executed by a processor, cause the processor to:
send a first random access preamble to a network device, wherein the first random access preamble is used by the user equipment to access the network device; and
in response to the user equipment failing to access the network device using the first random access preamble, sending at least one second random access preamble to the network device, wherein access characteristic information of each of the at least one second random access preamble is different from access characteristic information of the first random access preamble, and the access characteristic information comprises elements of a time length, a transmit power, a transmit beam, and a random access resource, and the at least one second random access preamble is used by the user equipment to access the network device, and wherein the elements of the time length, the transmit power, the transmit beam, and the random access resource each have a respective priority, and wherein a sequence of priorities of the elements in descending order is the transmit beam, the random access resource, the transmit power, and the time length, and wherein a difference between the access characteristic information of the at least one second random access preamble and the access characteristic information of the first random access preamble is determined based on the access characteristic information with the highest priority.

14. The non-transitory computer-readable medium of claim 13, wherein access characteristic information of each one of the at least one second random access preamble is different from each other one of the at least one second random access preamble.

15. The non-transitory computer-readable medium of claim 13, wherein if a time length of each one of the at least one second random access preamble is different from the time length of the first random access preamble, the time length of each one of the at least one second random access preamble is greater than the time length of the first random access preamble.

16. The non-transitory computer-readable medium of claim 15, wherein if a transmit beam of each one of the at least one second random access preamble is different from the transmit beam of the first random access preamble, a random access resource of each one of the at least one second random access preamble is the same as or different from the random access resource of the first random access preamble.

17. The non-transitory computer-readable medium of claim 13, wherein if a random access resource of each one of the at least one second random access preamble is different from the random access resource of the first random access preamble, a transmit beam of each one of the at least one second random access preamble is the same as or different from the transmit beam of the first random access preamble.

18. The non-transitory computer-readable medium of claim 13, wherein a transmit power of each one of the at least one second random access preamble the same as or different from the transmit power of the first random access preamble, and transmit powers of any two of the at least one second random access preamble are the same or different from each other.

* * * * *